US012763502B2

(12) United States Patent
Cheng et al.

(10) Patent No.: US 12,763,502 B2
(45) Date of Patent: Oct. 13, 2026

(54) ELECTRICAL ELECTRICAL CONNECTOR WITH RESISTING PORTIONS AND METHOD OF MAKING SAME

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Shan-Yong Cheng, New Taipei (TW); Ming-Lun Szu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 966 days.

(21) Appl. No.: 18/069,392

(22) Filed: Dec. 21, 2022

(65) Prior Publication Data

US 2023/0198178 A1 Jun. 22, 2023

(30) Foreign Application Priority Data

Dec. 21, 2021 (CN) ......................... 202111570315.6
Dec. 21, 2021 (CN) ......................... 202111570328.3

(51) Int. Cl.
*H01R 12/71* (2011.01)
*H01R 13/24* (2006.01)
(Continued)

(52) U.S. Cl.
CPC ....... *H01R 12/714* (2013.01); *H01R 13/2407* (2013.01); *H01R 13/2435* (2013.01); *H01R 13/40* (2013.01); *H01R 13/629* (2013.01)

(58) Field of Classification Search
CPC ........................... H01R 12/74; H01R 13/2407; H01R 13/2435; H01R 13/40; H01R 13/629; H01R 12/73; H01R 13/41; H01R 43/20
See application file for complete search history.

(56) References Cited

U.S. PATENT DOCUMENTS 7,160,115 B2 1/2007 Huang
9,425,525 B2 8/2016 Walden et al.
(Continued)

FOREIGN PATENT DOCUMENTS

CN 201266708 Y * 7/2009
CN 201725907 U 1/2011
(Continued)

OTHER PUBLICATIONS

Machine Translation JP-3428757-B2, (dated Jul. 22, 2003) (Year: 2026).*

*Primary Examiner* — Travis S Chambers
(74) *Attorney, Agent, or Firm* — Ming Chieh Chang

(57) ABSTRACT

An electrical connector includes: a housing defining a first face and a second face opposite to the first face, plural grooves through the first face and the second face in an upper-lower direction, and plural positioning slots corresponding to the grooves; and plural terminals arranged in a matrix and retained in the housing, each terminal comprising a main portion, a first elastic arm extending toward the first face from the main portion, and a connecting portion extending towards the second face from the main portion, the first elastic arm defining a first contact portion protruding beyond the first face, wherein the main portions are received in the positioning slots, the housing defines a resisting portion at the first face near each positioning slot, and the resisting portions restrict the main portions from moving toward the first face of the housing.

18 Claims, 15 Drawing Sheets

(51) Int. Cl.
*H01R 13/40* (2006.01)
*H01R 13/629* (2006.01)

(56) References Cited

U.S. PATENT DOCUMENTS

| | | | | |
|---|---|---|---|---|
| 11,108,183 | B2 | 8/2021 | Liao | |
| 2023/0283003 | A1 * | 9/2023 | Cheng | H01R 12/714<br>439/66 |

FOREIGN PATENT DOCUMENTS

| | | | | | |
|---|---|---|---|---|---|
| CN | 209016309 | U | | 6/2019 | |
| JP | 3428757 | B2 | * | 7/2003 | H05K 3/32 |
| TW | M450851 | U | | 4/2013 | |
| TW | M458697 | U | | 8/2013 | |
| TW | M586889 | U | | 11/2019 | |
| TW | M603205 | U | | 10/2020 | |

* cited by examiner

ELECTRICAL ELECTRICAL CONNECTOR WITH RESISTING PORTIONS AND METHOD OF MAKING SAME

BACKGROUND OF THE INVENTION

Field of the Invention

The present invention relates generally to an electrical connector, particularly to a terminal-restricting structure for an electrical connector.

Description of Related Arts

China Utility Model No. 210111103 discloses an electrical connector for connecting a chip module to a circuit board, which comprises an insulative base with terminal grooves and a plurality of terminals retained in the terminal grooves. Two sides of the terminal are provided with retaining barbs and the retaining barbs are hard interfered with the inner side of the terminal groove so as to retain the terminals in the grooves. However, when the terminals are stressed or impacted during transportation, the terminals often fall off from the terminal grooves.

Therefore, it is desired to provide an electrical connector with an improved structure to overcome the above defects.

SUMMARY OF THE INVENTION

The objective of the present invention is to provide an electrical connector with terminals which can be better held therein.

To achieve the above object, an electrical connector comprises: a housing defining a first face and a second face opposite to the first face, plural grooves through the first face and the second face in an upper-lower direction, and plural positioning slots corresponding to the grooves; and a plurality of terminals arranged in a matrix and retained in the housing, each terminal comprising a main portion, a first elastic arm extending toward the first face from the main portion, and a connecting portion extending towards the second face from the main portion, the first elastic portion defining a first contact portion protruding beyond the first face, wherein the main portions are received in the positioning slots, the housing defines a resisting portion at the first face near each positioning slot, and the resisting portions restrict the main portions from moving toward the first face of the housing.

Other advantages and novel features of the invention will become more apparent from the following detailed description of the present embodiment when taken in conjunction with the accompanying drawings.

DETAILED DESCRIPTION OF THE DRAWINGS

Figure 5:
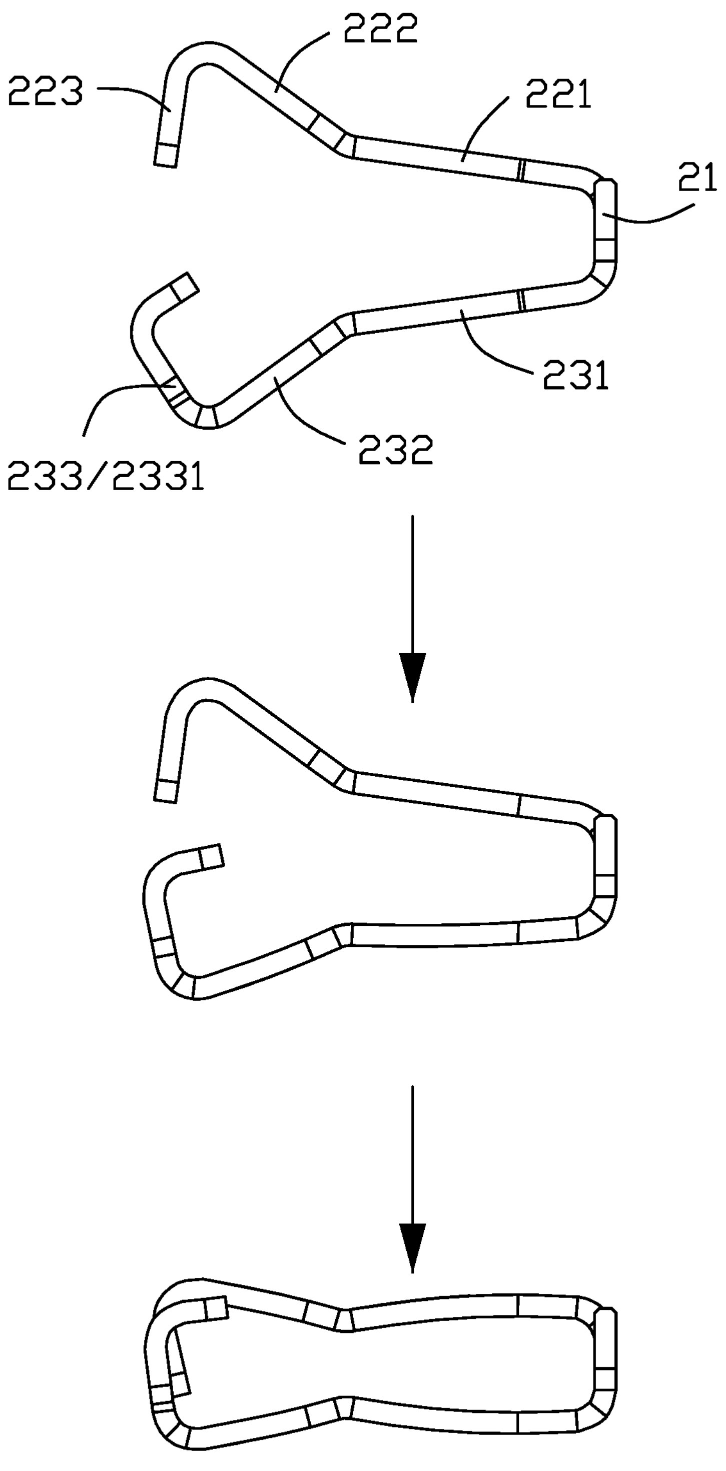
FIG. 5 is a side view of the terminal from the free state to the working state.
Figure 6:
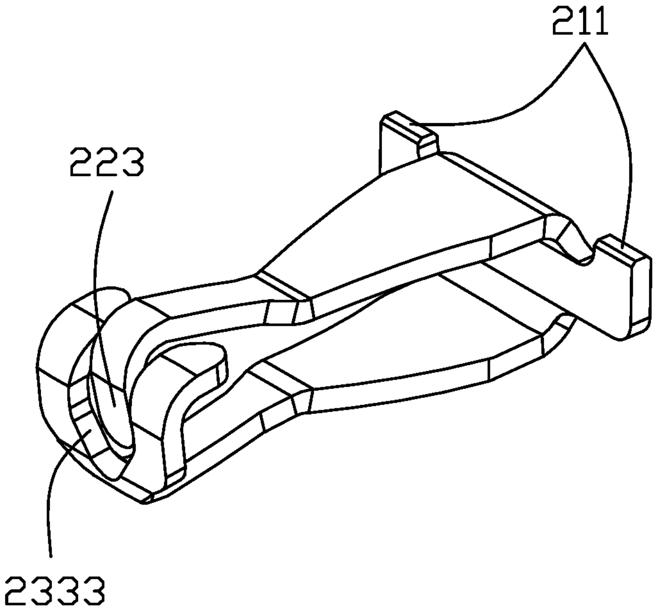
FIG. 6 is a perspective view of the terminal in the working state.
Figure 7:
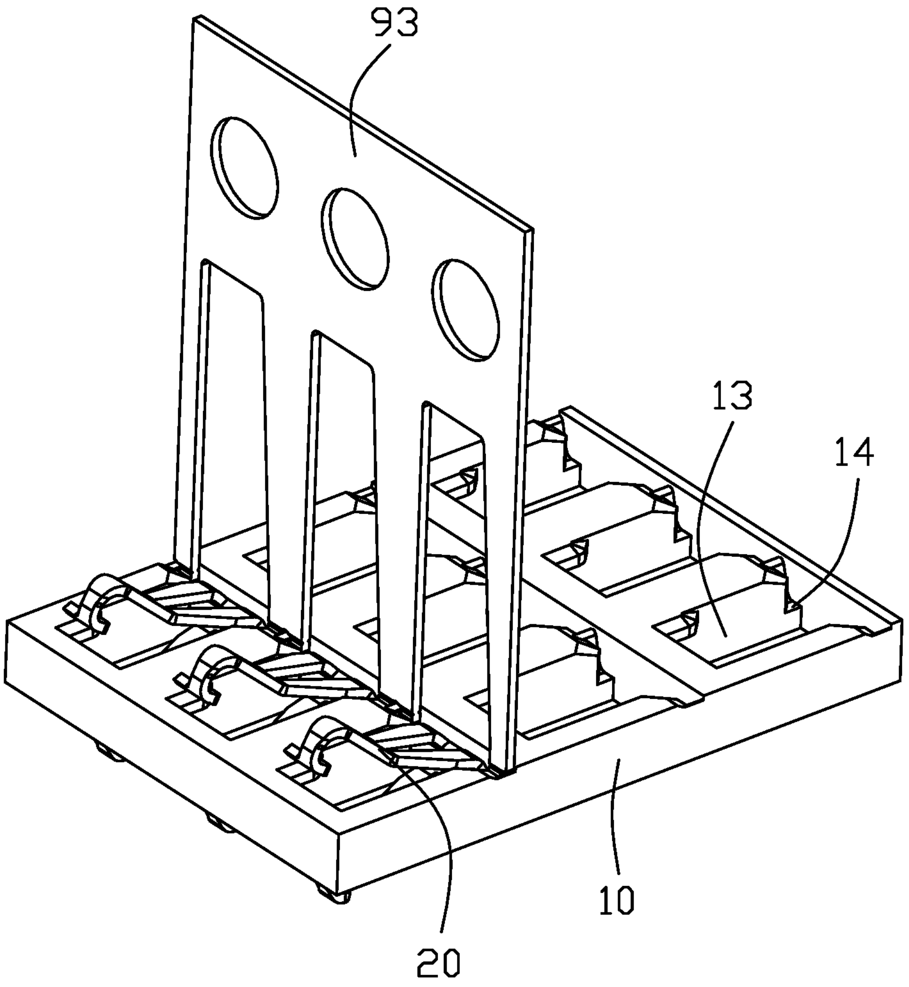
FIG. 7 is a perspective view of an electrical connector according to a second embodiment, wherein the terminals are connected with a metal strip.
Figure 8:
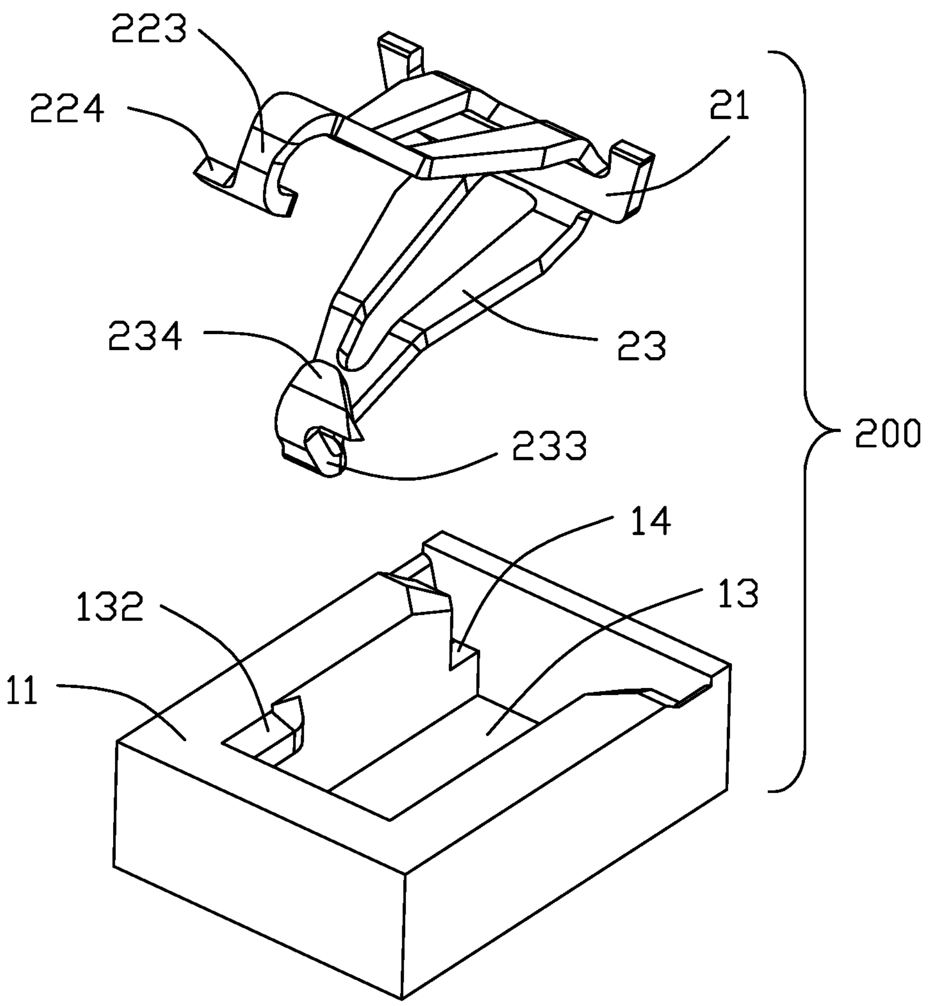
FIG. 8 is an exploded perspective view for the electrical connector of FIG. 7, only one terminal and one groove are shown.
Figure 12:
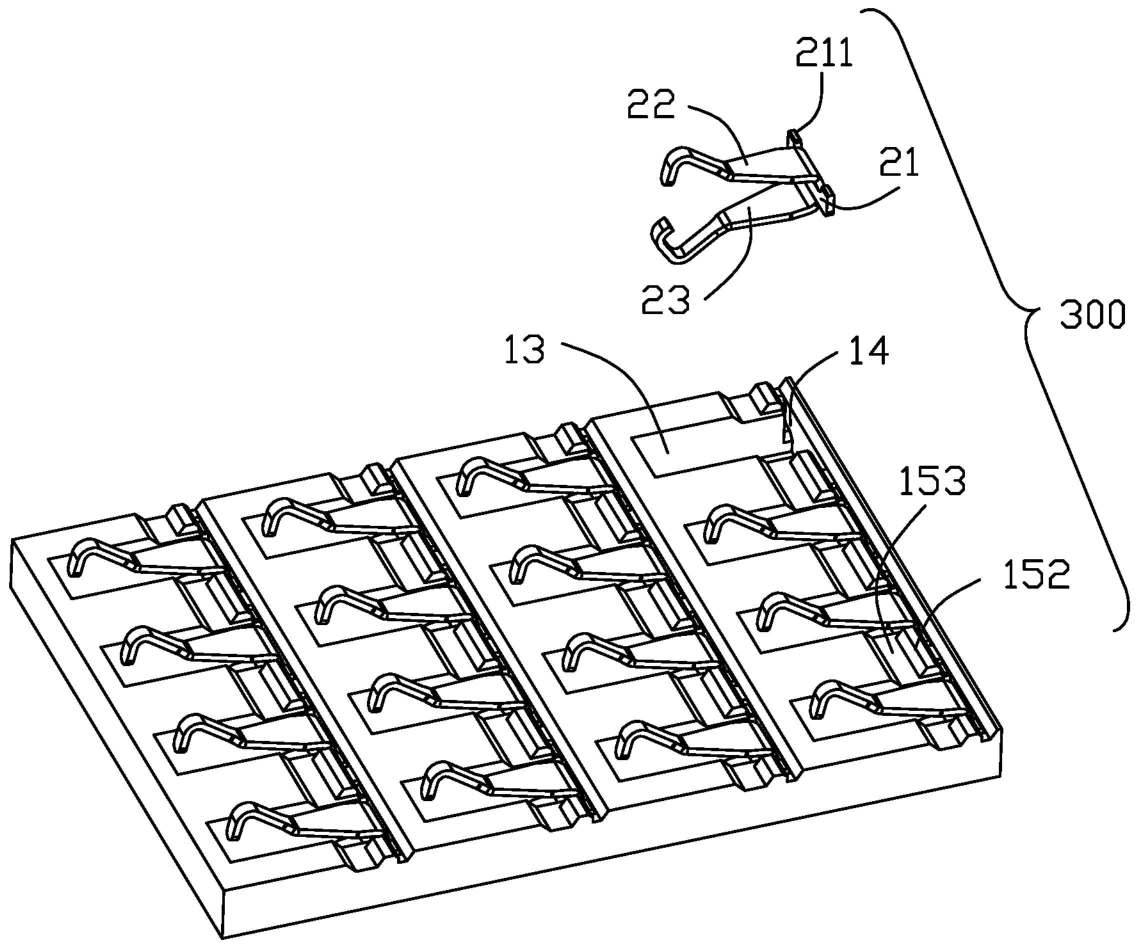
FIG. 12 is an exploded perspective view of an electrical connector according to a third embodiment, wherein one terminal is separated from the housing.
Figure 13:
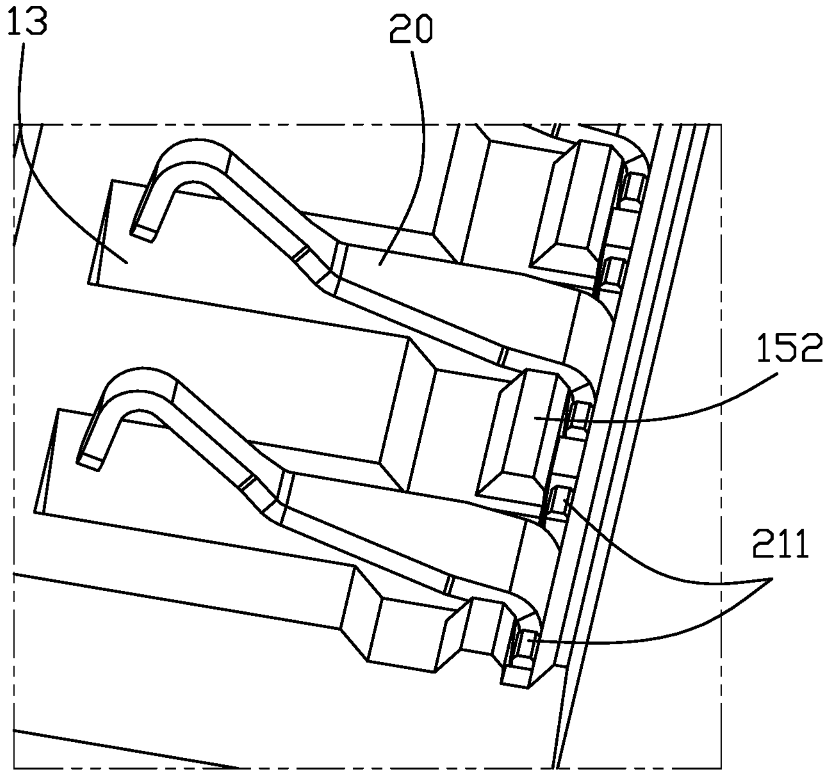
FIG. 13 is a partially enlarged perspective view of FIG. 12.
Figure 14:
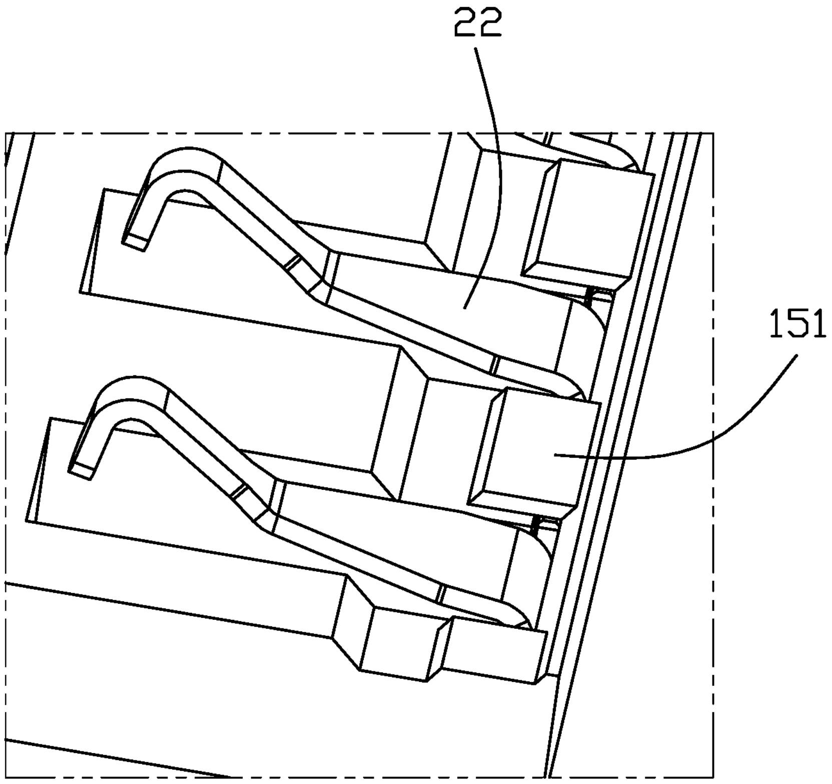
FIG. 14 is a perspective view of FIG. 13, wherein a resisting portion is formed.
Figure 15:
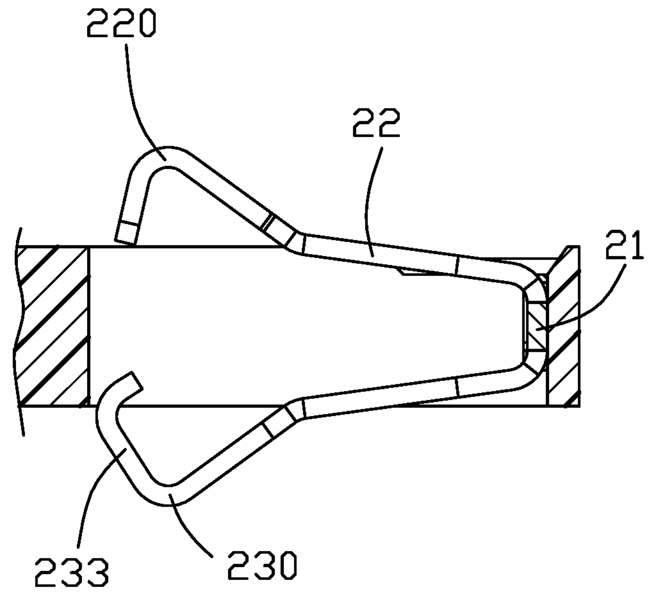
FIG. 15 a cross-sectional view of the electrical connector, wherein the terminal is assembled in the housing.

Referring to FIGS. 1-6, an electrical connector 100 according to the first embodiment of this present invention is illustrated, which comprises a housing 10 and a plurality of conductive terminals 20 arranged in a matrix in the housing, but only one terminal is shown in the figures. The housing 10 is injection-molded from insulating material and defines a first face 11 and a second face 12 opposite to the first face 11, a plurality of terminal grooves 13 penetrating through the first face 11 and second face 12 in an upper-lower direction, and positioning slots 14 at one side of the grooves 13. The grooves 13 are arranged in a matrix, for example, a 3×3 matrix arrangement is shown in FIG. 7 and a 4×4 matrix arrangement is shown in FIG. 12. The terminals 20 are retained in the positioning slots 14 and accommodated in the corresponding grooves 13 one by one. The terminal 20 comprises a main portion 21, a first elastic arm 22 extending obliquely from the main portion 21 to the first face 11 and a connecting portion **23*a* extending from the main portion 21 to the second face 12. The first elastic arm 22 has a first contact portion 220 protruding from the first face 11 and can move in the groove 13 along the upper-lower direction. In this embodiment, the connecting portion 23*a* is in a form of a second elastic arm 23 defining a second contact portion 230 protruding from the second face 12. The positioning slots 14 run upwards through the first face 11, but do not run through the second face 12 so as to define a bottom inside 140 near the second face 12. Alternatively, the positioning slots 14 can be wholly blocked by a bottom portion of the housing, or partially run through the bottom portion of the housing. The main portions 21 of the terminals 20 are retained in the positioning slots 14, and the bottom insides 140 of the positioning slots 14 limits the main portions 21 when the terminals move toward the second face 12. The first elastic arms 22 or the connecting portions 23*a* are restricted by the grooves 13 in the upper-lower direction to further limit the movement of the terminals 20 to the second face 12, so that the terminals 20** are restricted in the upper-lower direction.

Figure 1:
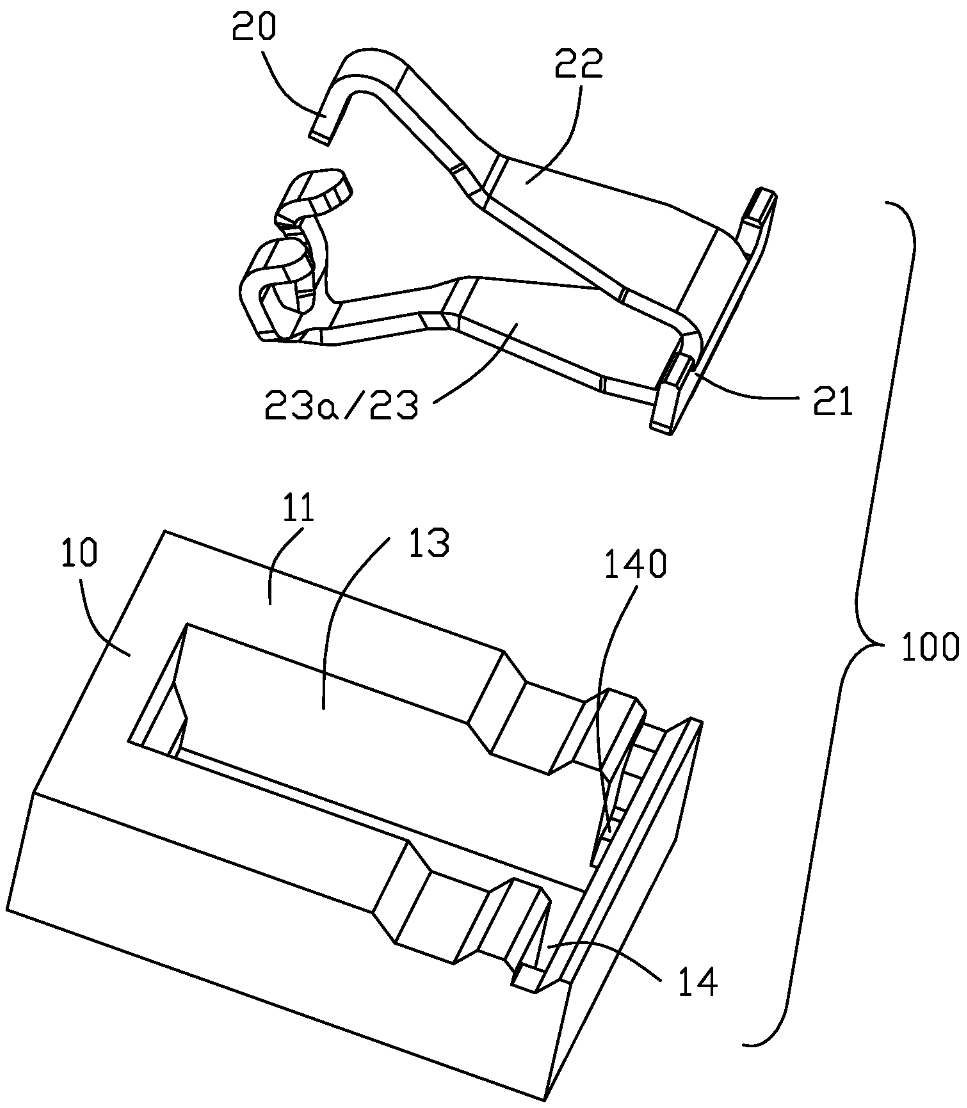
FIG. 1 is an exploded perspective view of an electrical connector according to a first embodiment of this present invention, only one terminal and one terminal groove are shown.
Figure 2:
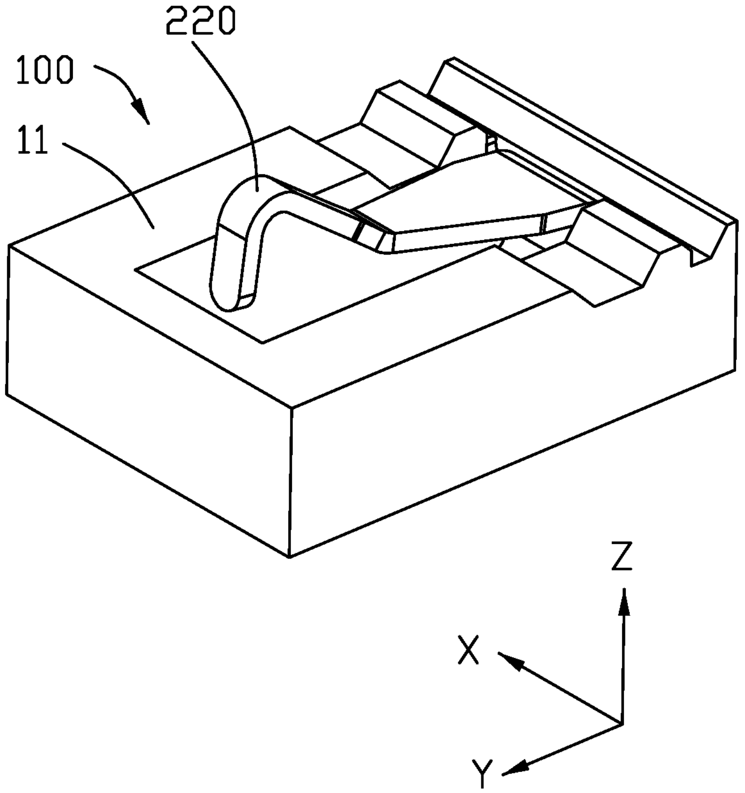
FIG. 2 is a perspective view of the electrical connector shown in FIG. 1.

For an convenience of description, in the present invention, in FIG. 2, an X direction is defined in a lateral direction or a left-right direction; a Y direction is defined in a front-rear direction, and a Z direction is defined in an upper-lower direction. Clearly shown, the grooves 13 are located in front of the positioning slots 14, and the first face 11 is located above the second face 12. The main portion 21 of the terminal is in a vertical plate, which is inserted into the positioning slot 14 from the first face 11. An improvement of the present invention lies in that the main portions 21 are fixed in the positioning slots 14 with no hard interference. In convention art, terminals are usually hard interfered with the housing, that is, opposing plate faces of the main portion 21 are tightly clamped with the housing in the front-to-back direction, and cutting faces with bars of the main portion 21 are tightly clamped in the lateral direction, resulting in the terminals cannot move in said three directions and may be destroy the housing. In this embodiment, the main portions 21 restrict the terminals 20 from moving downward or toward the second faces 12 by the bottom insides 140 of the positioning slots 14. Therefore, there is a certain small gap in the front-back direction and the lateral direction between the main portion 21 and the housing 10, and the main portions 21 can shift slightly in the positioning slots 14. Although, due to the relatively small size of the terminals 20 and the housing 10, associated space is relatively small, the key of the present invention is that the terminals 20 are in a non-hard interference state in the housing. The positioning slots 14 can limit the main portions 21 in the front-back direction and the lateral direction. However, the terminals 20 should be blocked from moving upward or toward the first face 12 to prevent the terminal 20 from falling off from the housing 10, especially during transportation of the terminals 20 to a printed circuit board for soldering.

Figure 4:
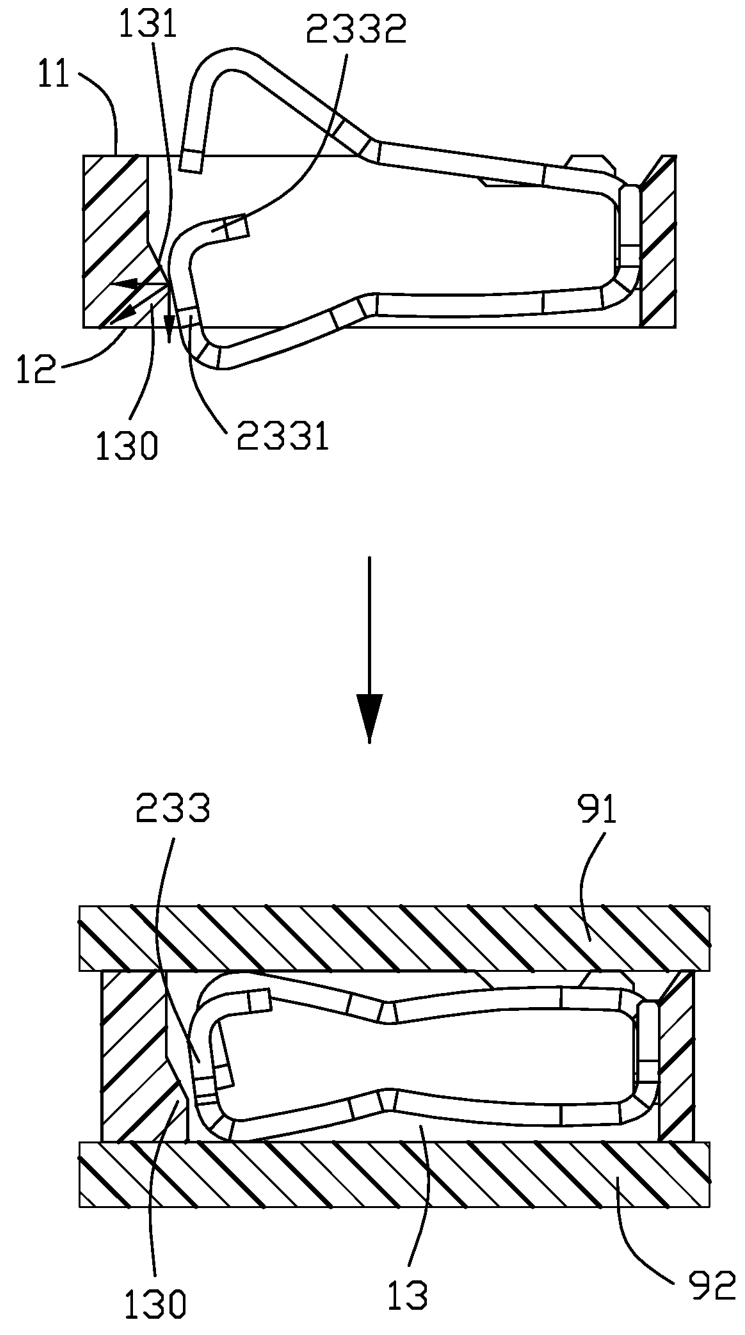
FIG. 4 is a cross-sectional view of the electrical connector when the terminal is from a free state to a working state.

Referring to FIG. 4, in this embodiment, the groove 13 defines a protruding portion 130 adjacent to the second face 12, which protrudes toward the second elastic arm 23, an end portion 233 of the second elastic arm 23 abuts against the protruding portion 130. As shown in FIG. 4, the force of the end portion 233 exerting on the protruding portion 130 is subjected to a downward component force which prevents the second elastic arm 23 from moving toward the first face 11. The end portion 233 of the second elastic arm 23 includes a first inclined portion 2331 extending from the contact portion 220 and a second inclined portion 2332 extending continually from the first inclined portion 2331 and bending towards the main portion 21. The first inclined portion 2331 together with a connecting part nearby forms a V shape facing the first face 11, the second inclined portion 2332 and the first inclined portion 2331 abutting against the protruding portion 130 collectively form a V-shape facing the main portion 21.

In this embodiment, preferably, the terminals 20 are roughly in shape of a clip, the main portion 21 is elongated and extends laterally, in the grooves 13, the first elastic arms 22 extend obliquely upward and forward from the main portions 21 and the second elastic arms 23 are arranged at an angle with the first elastic arms 23 and extend downwards and obliquely forward. The positioning slot 14 is a long groove corresponding to the shape of the main portion 21. A width of the positioning slots 14 is slightly larger than a thickness of the main portion 21 along the front-rear direction, and the length of the positioning slot 14 along the left-right direction is slightly longer than a length of the main portion 21 in the lateral direction, so that the housing 10 is compact and the main portion 21 can be easily installed into the positioning slot 14. It can be understood that, as the main portion 21 is not fitly interfered in the positioning groove 14, the main portion 21 can shift but is limited in the front-back direction and in left-right direction perpendicular to the upper-lower direction, that is, main portion can move within a small range in the positioning slot 14.

Figure 3:
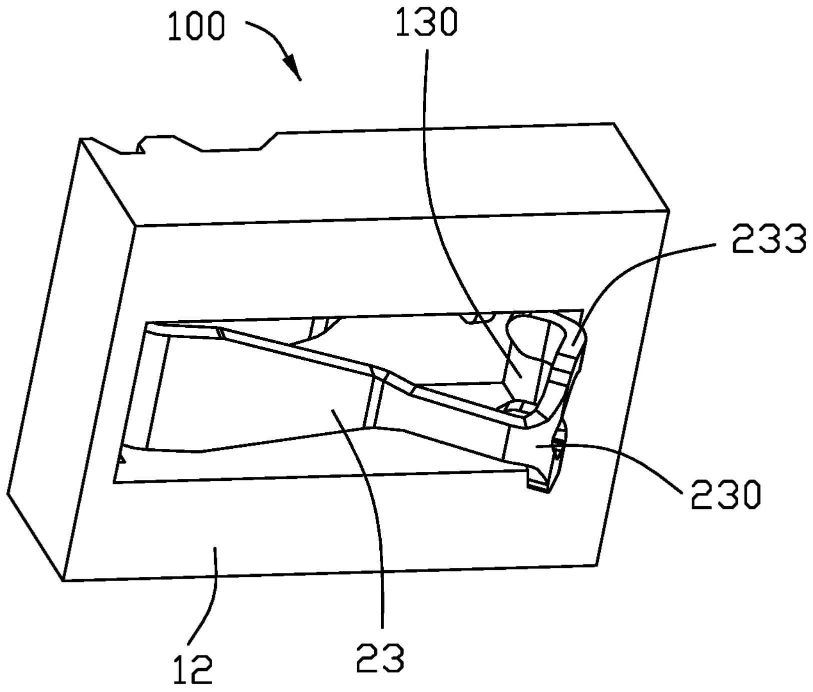
FIG. 3 is another perspective view of the electrical connector shown in FIG. 2.

Referring to FIGS. 3-5, in order to make the terminals 20 stably arranged in the grooves 13 and the positioning slots 14 conveniently, the terminals 20 are elastically supported in the grooves 13. Preferably, the groove 13 defines the protruding portion 130 at inner side thereof protruding toward the second elastic arm 23 near the second face 12, and the end portion 233 of the second elastic arm 23 elastically abuts on the protruding portion 130. Therefore, the terminals 20 are restricted from moving to the first face 11 in the upper-lower direction, and the movement of the terminals 20 in other directions can also be restricted. In this embodiment, the grooves 13 are located in front of the positioning slots 14 and are in a roughly rectangular shape, the protruding portion 130 is located in the front of the groove 13. The first inclined portion 2331 extends obliquely upward and forward from the contact portion 230 of the second elastic arm 23, and the second inclined portion 2332 extends obliquely toward the main portion 21. To facilitate an installation of the terminals 20 from top to bottom, the protruding portion 130 defines a guiding face 131 inclined and facing upwards.

Refer to FIGS. 4 and 5 illustrating changes of the terminal 20 during the terminal before install, after install, and in a working state. When the two electronic components 91, 92, such as circuit boards, chips, etc., respectively confront against the first and second faces 11, 12 of the electrical connector 100, the first elastic arm 22 and the second elastic arm 23 are pressed by the electronic components 91, 92 respectively and move toward each other along the upper-lower direction, making the first inclined portion 2331 away from the protruding portion 130 to avoid the influence of the inner faces of the groove 13 on the terminal 20. In order to prevent free ends of the first elastic arm 22 and the second elastic arm 23 from interfering with each other when approaching, the second elastic arm 23 defines a notch 2333 on the first inclined portion 2331 and the second inclined portion 2332. As shown in FIG. 6, the notch 2333 of the end portion 233 of the second elastic arm 23 is like a bifurcation, so that the end of the first elastic arm 22 can be accommodated in the notch 2333 of the second elastic arm 23 when the first and second elastic arms 22, 23 are pressed and move toward each other. In this embodiment, in order to make the first elastic arm 22 and the second elastic arm 23 have better elasticity, the second elastic arm 23 comprises an obliquely first elastic portion 231 extending downward and forward from the main portion 21 and a second elastic portion 232 extending downward and forward from the first elastic portion 231 continuously, and the contact portion 230 is located at the end of the second elastic portion 232. Similar to the second elastic arm 23, the first elastic arm 22 includes a first elastic portion 221 and a second elastic portion 222. In addition, the first and second elastic portion 221, 222 of the first elastic arm 22 are arranged symmetrically with the first and second elastic portion 231 and 232 of the second elastic arm 23 along the upper-lower direction respectively. In this embodiment, the main portion 21 defines cutting faces 211 on both sides of the elastic arms 22, 23, and the cutting faces 211 remain after the terminal is cut off from a metal strip.

Referring to FIGS. 7-11 illustrating an electrical connector 200 according to a second embodiment of the present invention, the electrical connector 200 is similar to the electrical connector 100 and the same reference numerals are used to label the same elements and detailed descriptions are omitted. Only the differences will be introduced. Notably, the terminals 20 are installed in the positioning slots 14 and a construction for limiting an upward movement of the main portions 21 is introduced.

The first elastic arm 22 defines a first protrusion 224 protruding laterally at a distal end thereof, and the groove 13 defines a first abutment 132 at inner side thereof near the first face 11. The first protrusion 224 is blocked under the first abutment 132, thereby restricting the terminal 20 from an up movement toward the first face 11 in the upper-lower direction. The groove 13 further defines a second abutment 133 near the second face 12, the second elastic arm 23 defines a laterally protrusion 234 which is located on the second abutment 133 to restrict the terminal 20 from moving downward or toward the second face 12 in the vertical direction. The first and second elastic arm 22, 23 are elastically pre-compressed when the first and second protrusion 224, 234 press against the corresponding first and second abutment 132, 133.

The second elastic arms 23 restrict the terminals from the up movement in the first embodiment. The first elastic arms 22 restrict the terminals from the up movement in the second embodiment. Alternatively, connecting portion 23*a* can be a soldering portion used to be soldered to a circuit board or other parts.

Figure 9:
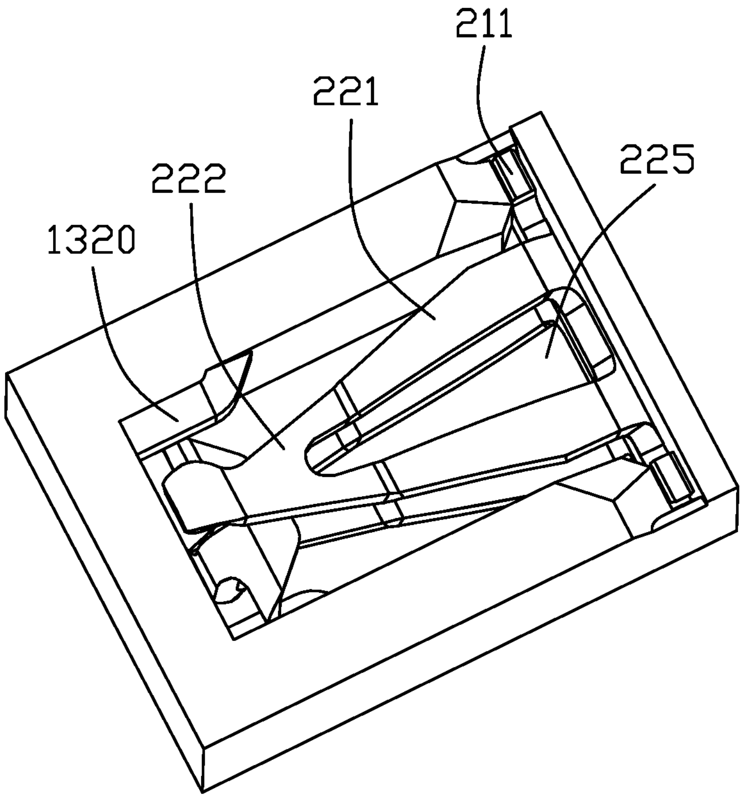
FIG. 9 is a top perspective view of the electrical connector of FIG. 8.
Figure 10:
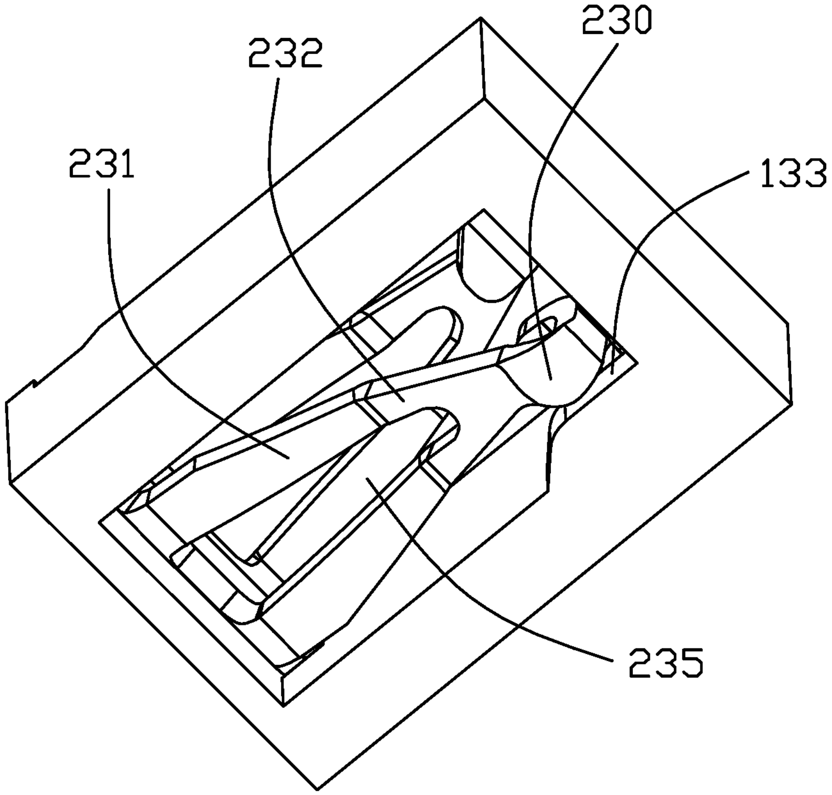
FIG. 10 is a bottom perspective view of the electrical connector of FIG. 9.

Referring to FIG. 7 illustrating a method of assembling a row of the terminals in the housing 10, a row of the terminals 20 unites with a metal strip 93, the metal strip 93 connects with the main portions 21 of the terminals. Firstly, the main portions 21 with the metal strip 93 are pressed downwards and into the positioning slots 14 until blocked against the bottom insides 140 of the positioning groove 14. Secondly, the metal strip 93 is cut off. Referring to FIGS. 9-10, the first elastic arm 22 defines a slot 225 extending from the first elastic portion 221 to the second elastic portion 222 thereof, and the second elastic arm 23 defines a slot 235 extending from the first elastic portion 222 to the second elastic portion 231 thereof, and the slots 225, 235 can increase an elasticity of the first elastic arm 22 and the second elastic arm 23. The first abutment 132 defines a guide surface 1320 inclined downward so as to facilitate the installation of the terminals 20.

Figure 11:
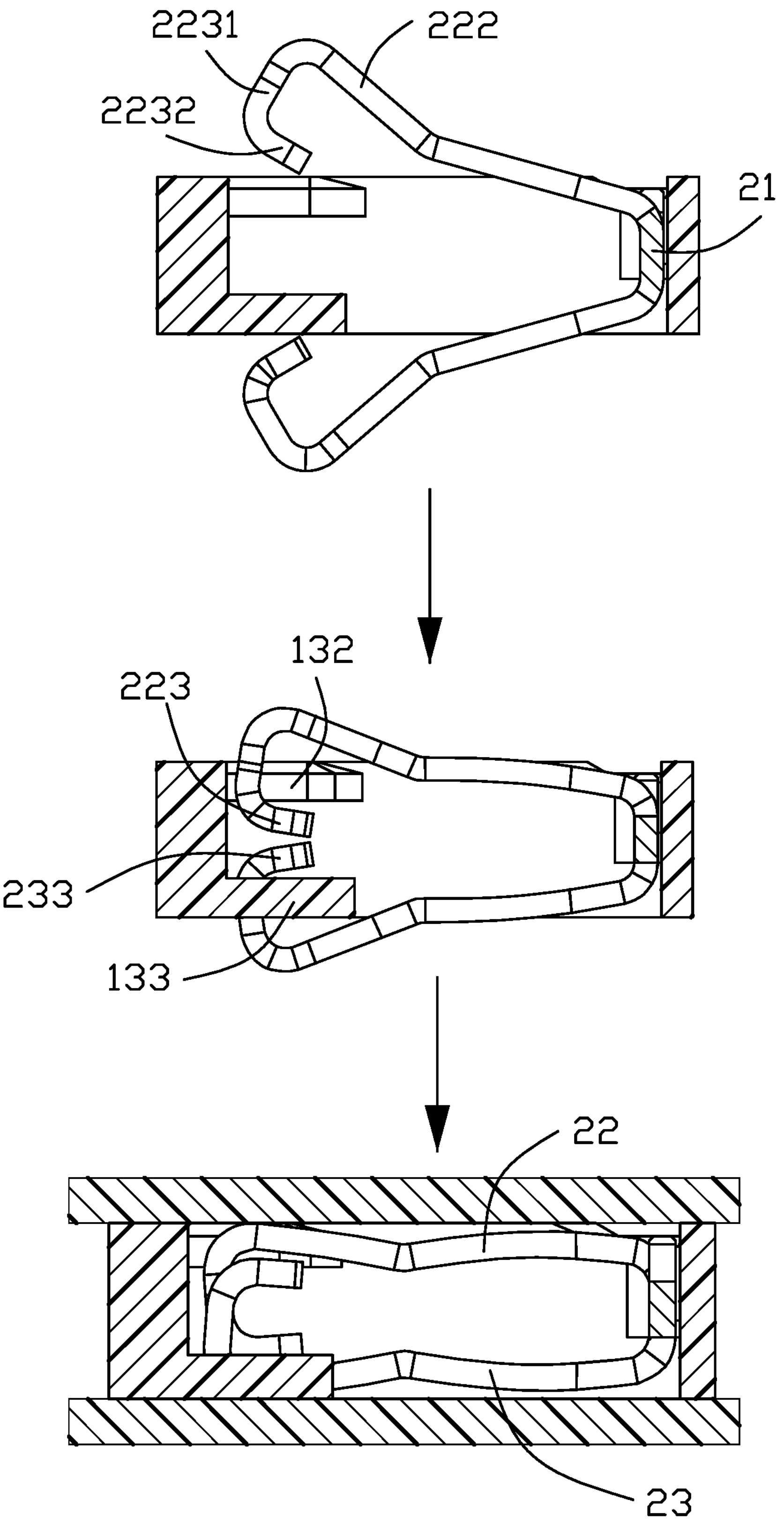
FIG. 11 is a cross-sectional view of the terminal from the free state to the working state according to the second embodiment.

Referring to FIG. 11 illustrating changes of the terminal 20 in the groove 13. The main portion 21 are retained in the portioning slot as shown in the top figure in FIG. 11, and the elastic arms are located at an outer side of the housing. Then elastic arms 22, 13 are pressed inwards into the housing, so that the terminal is in a free state after installed but before mating with the two boards as shown in the middle figure in FIG. 11. In the free state, the first and second elastic arms work with the protrusions 132, 133. By the deformation of the first and second elastic arms 22, 23, the first protrusion 224 goes past and abuts on the lower side of the first abutment 132 and the second protrusion 234 goes past and abuts on the upper side of the second protruding portion 133. When the electronic components 91, 93 are pressed against the first and second faces 11, 12, the first and second elastic arms 22, 24 are further pressed into the groove 13, and the inclined portions of the two elastic arms are overlap to each other in the vertical direction, in a work state.

Refer to FIGS. 12-15 illustrating an electrical connector 300 according to a third embodiment of the present invention. The limitation of the terminal 20 in the up movement is achieved by a new improved structure of the positioning slot 14. A resisting portion 151 is provided near the positioning slot 14 at the first face 11. The two cutting sides 11 of the main portion 21 is limited below the resisting portion 151. In one embodiment, the terminals are forced to go across the resisting portion 151 and enter into the positioning slot 14 by means of slight deformation, and thus the main portion 21 is stopped from going upward by the resisting portion 151. Therefore, the improvement makes the terminal 20 being restricted in the front-back, left-right, and upper-lower directions.

In one embodiment, the resisting portion 151 can be formed by extruding some insulating material of the housing 10. The first face 11 pre-holds surplus material or portion in a form of a protruding rib 152 before the housing is deformed by hot melt process or cold riveting process. After the main portion 21 is installed in the positioning slot 14 by a tool, the protruding rib 152 is pushed toward the positioning slot 14 by a jig and form the resisting portion 151. The resisting portion 151 is located above a top edge of the main portion 21. The cold riveting process mentioned here means that the housing 10 of the present invention is extruded and deformed by the jig at a room temperature. The hot melting process mentioned in this application means that the housing 10 is heated to a specific temperature, and then is extruded and deformed by the jig. The first face 11 is further provided with a concave portion 153 which is adjacent to the protruding rib 152 and on the other side of the protruding rib 152 opposite to the positioning slot 14 for accommodating the jig. The convex rib 152 is parallel to the positioning slot 14, two sides of which recessed inwardly to keep away from the corresponding groove 13. That is, the two sides of the protruding rib 152 are set at a certain distance from the adjacent positioning slot 14 to prevent some flowing material produced by the protruding rib 152 in hot melt process or cold riveting from entering into the corresponding groove 13 and affecting the movement of the first elastic arm 22 and the second elastic arm 23 of the terminal 20. In this embodiment, the resisting portion 151 closely covers the strip cutting face 211. Understandingly, the resisting portion 151 can also cover other parts of the main portion 21.

Firstly, the main portions 21 of a row of the terminals united with the strip 93 are inserted into the positioning slots 14. Secondly, the strip 93 is removed from the main portion 21 and remain cutting faces 211. Thirdly, the material of the housing 10 or the protruding rib 152 is squeezed by the jig and deform toward the positioning grooves 14 and form the resisting portion 151 covering on the cutting face 211 Thus the main portions 21 are stopped from moving toward the first face 11. Pre-cut small slits are provided at opposite sides of the strip 93 adjacent to the main portion 21 for the removal of the strip 93. After the main portion 21 is installed in the positioning slot 14, the strip 93 is broken along the pre-cut small slit and removed. In the present invention, preferably, the jig has a circular or square pressing tooth to press the housing 10. Extrusion of the housing 10 or protruding rib 152 by the jig can be carried out at normal temperature or at abnormal temperature. In the present invention, extrusion at normal temperature is preferred to avoid the impact of the heat program on the performance of the housing.

In the third embodiment, the first and second elastic arms of the terminal 20 are of simple structure without the slots 225, 235. The end portion 223 of the first elastic arm 22 extends forward and downward obliquely from the contact portion. The end portion 233 extends upwards and forwards obliquely from the contact portion 230, and then bends inwardly. It can be seen from FIG. 15 that most of the end portion is located outside the groove 13 and does not provide a limit for the terminal.

It can be understood that in the first and second embodiments, the main portion 21 can be the same as that in the third embodiment, and the shapes of the terminals in the first, second and third embodiments are not limited to the drawings shown in the present invention. The terminal can be the type with two elastic arms, or with only the first elastic arm, and the connecting portion 23*a* is a soldering leg or others. That is, after the terminals 20 are installed in the positioning slots 14 and the strip 93 is removed, a resisting portion 151 is formed by deforming the material of the housing 10 toward the positioning slot 14 with the jig, so that the deformed material covers above the main portion 21, thereby restricting the movement of the portion 21 toward the first face 11.

By means of the cooperation between the main portion 21 and the elastic part or the improvement of the groove itself, the terminals in the above three embodiments of the present invention can overcome the problem that the housing should be high enough to have space for hard interference, so the housing can be as low as 3.5 mm. Relatively speaking, by cooperation with the elastic part, the change of the main portion 21 is small, so the change of the mold is also small and the manufacturing process of existing products can still be used with only little modification.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. An electrical connector comprising:

a housing defining a first face and a second face opposite to the first face, plural grooves through the first face and the second face in an upper-lower direction, and plural positioning slots corresponding to the grooves; and a plurality of terminals arranged in a matrix and retained in the housing, each terminal comprising a main portion, a first elastic arm extending toward the first face from the main portion, and a connecting portion extending towards the second face from the main portion, the first elastic arm defining a first contact portion protruding beyond the first face;

wherein the main portions are received in the positioning slots, the housing defines a resisting portion at the first face near each positioning slot, and the resisting portions restrict the main portions from moving toward the first face of the housing; and wherein the resisting portions are formed by extruding a surplus material of the housing on the first face after the main portions are received in the positioning slots, and the resisting portions are located above the main portions.

2. The electrical connector according to claim 1, wherein the surplus material is in a form of a convex rib near a corresponding positioning slot.

3. The electrical connector as claimed in claim 2, wherein the first face defines a concave portion adjacent to the convex rib, the concave portion and a corresponding positioning slot are at opposite sides of the convex rib.

4. The electrical connector as claimed in claim 3, wherein the convex ribs are flush with the first face.

5. The electrical connector as claimed in claim 3, wherein the convex rib is parallel to corresponding positioning slot, and two sides of the convex rib recessed inwardly from a corresponding inner side of the corresponding groove.

6. The electrical connector as claimed in claim 1, wherein the main portion defines a cutting face, and the resisting portion covers the cutting face.

7. The electrical connector as claimed in claim 1, wherein the positioning slot defines a bottom inside, and the main portion sits on the bottom inside of the positioning slot.

8. A method of making an electrical connector, comprising:

providing a housing having opposite first and second faces, a plurality of grooves through the first and second faces, and plural positioning slots corresponding to the grooves and opening to the first face;

providing a plurality of terminals each having a main portion, a first elastic arm with a first contact portion extending toward the first face, and a connecting portion extending toward the second face;

installing the main portions of the terminals into the positioning slots;

forming a resisting portion from the housing to cover on the main portion for restricting a movement of the main portion toward the first face, wherein the step of forming comprises deforming an insulating material of the housing on the first face toward the positioning slot by a tool to form the resisting portion.

9. The method as claimed in claim 8, wherein the step of forming comprises applying a circular or rectangular pressing tooth on an insulating material of the housing.

10. The method as claimed in claim 8, wherein the step of forming is implemented at a room temperature.

11. The method as claimed in claim 8, wherein the first face defines a convex rib close to the positioning slot, and the step of forming comprises extruding the convex rib to form the resisting portion.

12. The method as claimed in claim 11, wherein the first face defines a concave portion adjacent to the convex rib, the concave portion and the positioning slot are located on opposite side of the convex rib.

13. The method as claimed in claim 12, wherein the convex ribs are flush with the first face.

14. An electrical connector comprising:

a housing having opposite first face and second face, plural grooves through the first face and the second face in an upper-lower direction, and plural positioning slots corresponding to the grooves; and a plurality of terminals retained in the housing, each terminal comprising a main portion which defines two top cutting faces;

a first elastic arm extending toward the first face from the main portion, and the first elastic arm defining a first contact portion protruding beyond the first face;

wherein the main portions are received in the positioning slots one by one, the housing defines plural resisting portions at the first face near to the positioning slots, and the resisting portions press against the top cutting faces of the main portions, thereby restricting the main portions from moving toward the first face of the housing; and wherein the resisting portions are formed by extruding a surplus material of the housing on the first face after the main portions are received in the positioning slots.

15. The electrical connector according to claim 14, wherein the surplus material is in a form of a convex rib near a corresponding positioning slot.

16. The electrical connector as claimed in claim 15, wherein the first face defines a concave portion adjacent to the convex rib, the concave portion and a corresponding positioning slot are at opposite sides of the convex rib.

17. The electrical connector as claimed in claim 14, wherein the two top cutting faces are at two sides of the first elastic arm respectively.

18. A method of making an electrical connector, comprising the steps of:

providing a housing having opposite first and second faces, a plurality of grooves through the first and second faces, and plural positioning slots corresponding to the grooves and opening to the first face;

providing a plurality of terminals each having a main portion, a first elastic arm with a first contact portion extending toward the first face, and a connecting portion extending toward the second face;

installing the main portions of the terminals into the positioning slots; and forming a resisting portion from the housing to cover on the main portion for restricting a movement of the main portion toward the first face;

wherein the first face defines a convex rib close to the positioning slot, and the step of forming comprises extruding the convex rib to form the resisting portion.

* * * * *